Aug. 15, 1961  E. F. MACKS  2,996,340
FLUID DYNAMIC BEARING AND METHOD OF MAKING SAME
Filed June 26, 1956  2 Sheets-Sheet 1
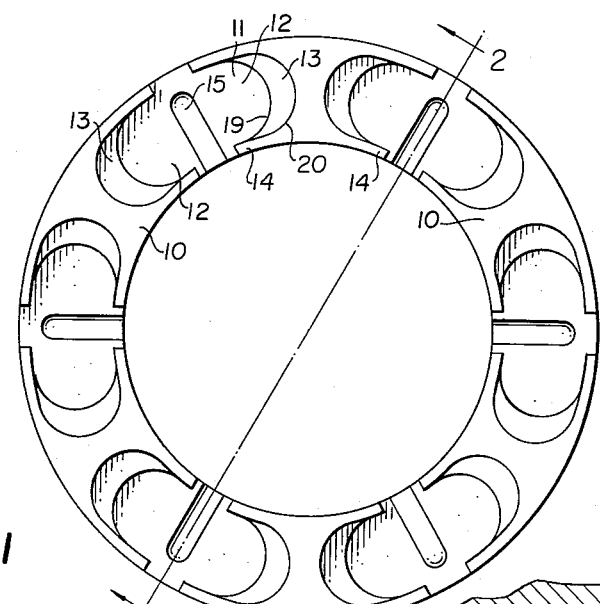
Fig. 1
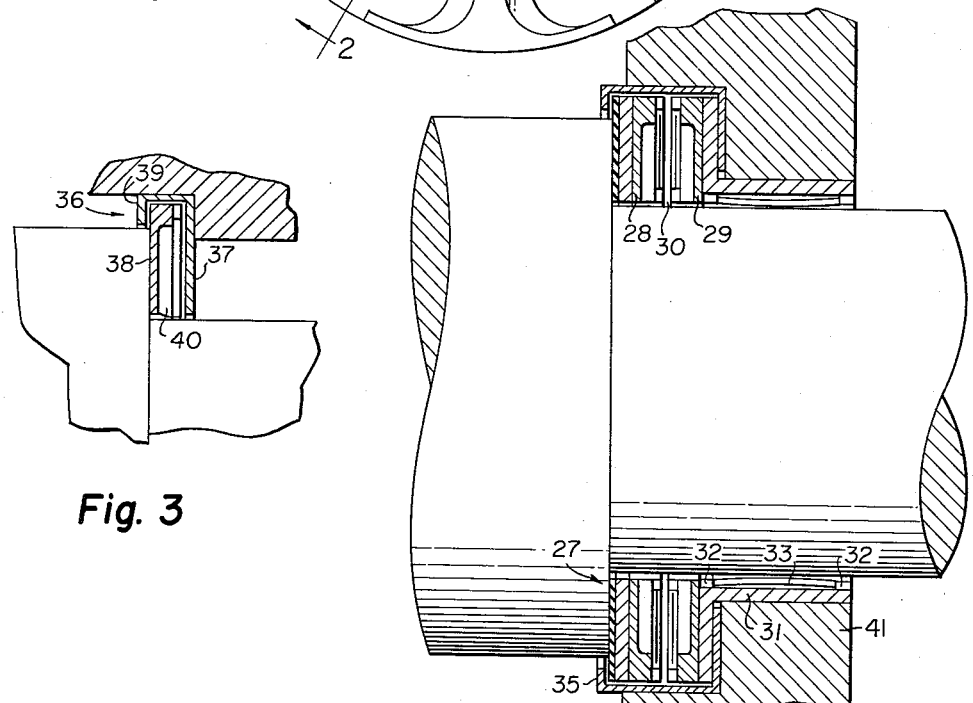
Fig. 3
Fig. 2
INVENTOR.
ELMER FRED MACKS
BY Pyle and Fisher
ATTORNEYS Aug. 15, 1961   E. F. MACKS   2,996,340
FLUID DYNAMIC BEARING AND METHOD OF MAKING SAME
Filed June 26, 1956   2 Sheets-Sheet 2

INVENTOR.
ELMER FRED MACKS
BY Pyle and Fisher
ATTORNEYS

United States Patent Office 2,996,340
Patented Aug. 15, 1961

2,996,340
FLUID DYNAMIC BEARING AND METHOD OF MAKING SAME
Elmer Fred Macks, Willow Lane, Vermilion, Ohio
Filed June 26, 1956, Ser. No. 594,026
12 Claims. (Cl. 308—163)

This invention relates to fluid dynamic mechanisms and more particularly to surfaces of the type having a minute stepped convergence construction to produce a load carrying film of fluid between such a surface and an opposing surface by means of relative motion therebetween.

It has long been known that a stepped convergence surface which confronts and moves relatively to a smooth complemental surface will theoretically produce a load carrying fluid film in a highly efficient manner. The principal shortcoming of this type of fluid film producing apparatus has been that much of the fluid pressure is lost by lateral escape. It has also been proposed that compensators be employed to limit this lateral fluid escape. These compensators take the form of longitudinally extending shoulders which lie along the path of relative movement of the two fluid film producing elements.

An objection to prior known devices has been the difficulty encountered by the presence of dirt and foreign particles.

It is, then, a principal object of this invention to provide a compact cartridge thrust bearing unit which is permanently closed to retard the introduction of dust and other foreign particles to the area of the opposed film producing surfaces.

One of the principal disadvantages of prior known stepped convergence fluid film producing devices has been that considerable wear and drag is experienced when the relative movement of the two elements is either started or stopped.

Accordingly, one of the principal objects of this invention is to provide a laminated device having a layer of solid lubricant disposed thereon and the stepped convergence construction defined in a surface which at least in part is a solid lubricant surface.

The prior known fluid dynamic film producing devices of the stepped convergence type are highly efficient devices which are known to produce excellent load carrying characteristics with minimum frictional resistance. It has been discovered that even these characteristics can be enhanced, however, through the provision of three or more progressively stepped surfaces in a stepped convergence construction.

A further object of this invention, therefore, is to provide a fluid film producing fluid dynamic device in which three or more stepped surfaces are employed to produce a load carrying film of high mean pressure and excellent lubricating characteristics.

Still another object of this invention is to provide a device in which such a fluid film is a film of gas.

It has further been discovered that the operating characteristics of a device of the type disclosed may be even further enhanced by providing stepping convergence surfaces on each of the opposed surfaces. In this construction each of the surfaces is stepped progressively closer to the opposed surface in the direction of intended relative movement.

It is, then, a further object of this invention to provide a compound fluid film producing device in which each of the opposed relatively moving surfaces has a stepped convergence construction.

It has further been discovered that a reversible thrust washer can be constructed where the stepped convergence surface has steps in both directions in order to produce a fluid film in either of two directions of relative movement.

It is, then, a further object of this invention to provide a thrust bearing having a reversible fluid dynamic film producing surface.

It has further been discovered that a reversible fluid dynamic thrust washer may be produced wherein the opposite faces are each fluid dynamic film producing surfaces with stepped convergence running in the same arcuate direction. Thus, when relative movement is in one direction, one of the face surfaces will produce a fluid dynamic film, and when relative rotation is reversed, the other surface will produce a fluid dynamic film.

Yet another object of this invention, then, is to produce a reversible fluid dynamic thrust washer having stepped convergence surfaces on either face.

Yet another object of this invention is to provide an improved fluid dynamic film surface by applying a laminate of solid lubricant in preselected areas of the face of a base member.

A further object of this invention is to provide a flexible thrust bearing which will yield with load and misalignment of an opposing surface and thus permit a stamped bearing to be used where rigid flatness tolerances need not be specified.

This latter object may be achieved by providing an outside diameter which is preferably at least twenty-five times greater than the thickness, and may further be achieved by providing a resilient back-up for the bearing.

Another more specilized object of this invention is to provide a combination thrust and journal bearing unit embodying fluid dynamic film producing principles for absorbing both journal and thrust forces.

Still another object of this invention is to provide a fluid dynamic thrust washer which will produce a fluid dynamic film between the washer and the shaft to hold the washer in circumferential spaced relationship with the shaft.

Still another object of this invention is to provide a novel method of inexpensively producing a thrust bearing which method comprises applying a laminate of solid lubricant to a base material and then stamping the bearing to form a step convergent object with a surface of solid lubricant material.

Still another object of this invention is to provide a method of producing stepped convergence surfaces, this method comprising an etching process wherein raised portions are protected and relieved areas therebetween are etched out.

Other objects and a fuller understanding of the invention may be had by referring to the following description and claims, taken in conjunction with the accompanying drawings, in which:

FIGURE 1 is a plan view of reversible fluid dynamic film producing thrust washer having two stepped convergences;

FIGURE 2 is a sectional view showing a sealed cartridge fluid dynamic thrust bearing and journal bearing combination unit carried in a housing and supporting a shaft the thrust bearing being as seen from the plane indicated by the line 2—2 of FIGURE 1.

FIGURE 3 is a sectional view of a simple cartridge thrust bearing unit;

Figure 4:
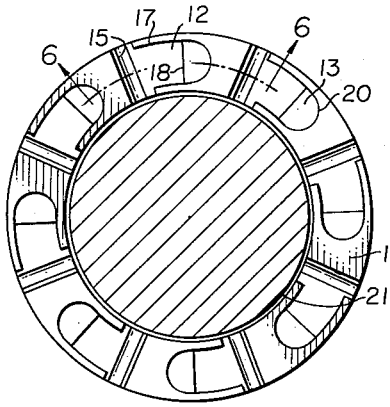
FIGURE 4 is a plan view, on a reduced scale with respect to FIGURE 1, of a multiple step convergence thrust bearing.

Referring to the drawings, and to FIGURE 1 in particular, a plan view of a reversible fluid dynamic film producing surface is shown. A plurality of spaced raised areas 10 are provided. Each of these raised areas is defined by a surface which lies in a plane common to the other surfaces and which is substantially normal, in the case of a bearing, to the axis.

A plurality of depressed areas 11 are provided. One of the depressed areas is located between each pair of adjacent raised areas 10. In the embodiments shown in the drawings, a multi-step construction is provided wherein the depression 11 has lower and intermediate plane surfaces 12, 13. For clarity of illustration, the dimensions have been greatly exaggerated. In actual practice, the surface of the lower depressed area 12 is within the range of approximately 0.00005 to 0.003 inch below the surface of intermediate depressed area 13. Additionally, the surface of the intermediate depressed area 13 is approximately 0.00005 to 0.003 inch below the surface of the raised areas 10, the exact dimensions depending upon the operating conditions.

The multi-step construction thus shown and described in FIGURE 1 and the corresponding multi-stepped construction which will be described in respect to FIGURE 4 have been shown as a two-step (three plane) construction. It is to be understood that more steps may be provided when operating conditions are better satisfied thereby.

A plurality of compensators 14 are provided. These compensators are shoulders which extend essentially along the direction of intended relative movement from the raised areas 10. In general, the compensators 14 have surfaces lying in the plane of the raised areas 10; however, the compensator surfaces may be slightly above the areas 10 in certain cases. In the case of a thrust washer the purpose of the compensators is to provide side walls to prevent radial escape of fluid from the depressed areas 11. Thus, as used in this specification and in the claims, a compensator is a shoulder which extends along a side of a depression to minimize fluid leakage from the depression.

A fluid supply groove 15 may be provided in the lower or leading portion of the depression 11. Each groove 15 is provided to facilitate the introduction of fluid into one of the depressed areas 11.

The embodiment of FIGURE 4 is for a single direction of rotation. It will be noted that the compensators, here indicated as 17, extend in but one direction from the raised areas 10. This direction of extension is essentially along the path of intended relative movement. Thus, an opposed surface placed in confronting relationship with the device shown in plan in FIGURE 4 would rotate in a clockwise direction. Conversely, if the opposed surface is stationary, the device of FIGURE 4 would rotate in a counter-clockwise direction to produce a load carrying film of fluid.

In operation, fluid enters through the groove 15. Fluid in a space between two opposing relatively moving surfaces has a tendency to adhere to each of the opposing surfaces. Thus, in FIGURE 4 when relative movement is present, the fluid tends to move, relatively speaking, in a clockwise direction from the lower depressed area 12 into the intermediate depressed area 13. Fluid pressure is built up as this fluid movement occurs. The fluid moves relatively from the intermediate area to the raised area 10 and yet a higher fluid pressure is produced. This process may, again, be repeated through additional steps if higher film pressure is desired and obtainable under conditions which vary with fluid, load, and the like.

A step wall at 18 forms a straight line of juncture between both the lower and the intermediate depressed areas 12 and 13 in FIGURE 4. A step wall at 19 forms corresponding lines of juncture 19 in FIGURE 1 which are curved. These varying configurations are shown to illustrate that the lines of juncture may take various shapes and forms depending upon varying conditions of load and operation. This, of course, is also true at end walls 20 which form lines of juncture with the depressed areas 13 and the raised areas 10 respectively, and additional lines of juncture if additional steps are provided. Since the depressions may vary in contour it will be seen that the compensators 17 and the compensators 14 may be of either uniform or tapering dimension normal to the direction of relative motion depending on the application.

The principle of operation which has been described with respect to FIGURE 4 is the principle which applies to FIGURE 1 as well. In FIGURE 1, however, one of the significant features of this invention is disclosed, that is, a surface may be constructed which will produce a fluid dynamic film in either direction of relative rotation. Thus, a stepped convergence is provided in both directions. Which surfaces will produce the supporting fluid film then, of course, depends on the direction of rotation. The surfaces which provide a stepped convergence in a clockwise direction will produce a film when those surfaces rotate in a relatively counter-clockwise direction and vice versa.

An additional feature of the invention is disclosed in FIGURE 4. In that view the peripheral surface of the shaft and the inner surface form a fluid film in the area indicated at 21. The surfaces are complemental cylindrically contoured surfaces which are closely spaced to provide a construction wherein the washer will be held in non-touching relationship with the shaft.

Figure 6:
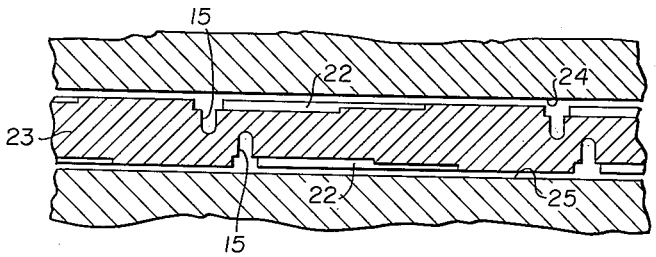
FIGURE 6 is a fragmentary sectional view on an enlarged scale of first and second members spaced by a reversible thrust bearing, the bearing being shown as seen from the line indicated by 6—6 of FIGURE 4.

In FIGURE 6 a further significant feature of the invention is disclosed. A reversible thrust bearing or washer is shown which has fluid dynamic film producing surfaces on both sides. It will be noted that the compensators, here indicated as 22, on both sides extend in the same arcuate direction. This is because the relative movement of the thrust bearing 23 is in the same direction with respect to surfaces 24, 25. Thus, when the bearing 23 is moving with the surface 25, the surface 24 is moving relatively to the right and the fluid dynamic film is built up adjacent the surface 24. If the direction of movement is reversed, the bearing 23 will move to the left with the surface 24. When the bearing moves with the surface 24, it moves relatively to the left with respect to the surface 25, and a fluid film is built up between the bearing and the surface 25.

Expressed another way, each of the surfaces of the bearing 23 forms a unidirectional thrust bearing surface. If, for example, the surface 25 is a shoulder on a shaft and the surface 24 is a complemental surface on a body such as a housing, when the shaft rotates in one direction a load carrying film will be built up between the surface 24 and the bearing. When rotation is reversed, the film is formed between the surface 25 and the bearing 23.

Referring to FIGURE 2, a cartridge unit which includes a compound, reversible thrust bearing is shown. Here the disclosed construction employs a pair of opposed surfaces, each of which has a configuration comparable to that disclosed in FIGURE 1.

The cartridge unit is indicated generally at 27. The unit has elements 28, 29 which produce a fluid dynamic load carrying film in the area indicated by 30 with either direction of relative rotation. Each of the elements 28, 29 has a stepped convergence surface, thus multiplying the fluid film producing effect under suitable conditions.

The element 29 has a journal bearing portion 31. The journal bearing portion here disclosed is also a stepped convergence fluid dynamic film producing device having compensators 32 and steps in a relieved area indicated by 33. The elements 28, 29 are permanently held together by a housing unit 35 which is crimped over the elements to hold them together in such a way as to greatly retard the entrance of dirt or foreign material.

A portion of a body member 41 is shown in FIGURE 2. The journal bearing portion 31 and the housing 35 are fixed to the body portion 41. The element 28 moves with the shaft while the element 29 is stationary with respect to the body 41. It will thus be seen that upon relative rotation a fluid dynamic thrust film will be built up in the region 30 between the elements 28, 29. A radial or journal load carrying film will be developed between the journal portion 31 and the shaft upon such relative rotation.

In the more simple cartridge unit, indicated at 36 in FIGURE 3, a housing element 37 and a thrust bearing element 38 are provided. In this construction, the peripheral portion 39 of the housing element 37 is crimped over to permanently hold the washer element 38. In the cartridge 36 of FIGURE 3 depressed area 40 is formed to provide a simple single stepped convergence surface where relative motion is experienced between the washer and the housing element 37.

Figure 5:
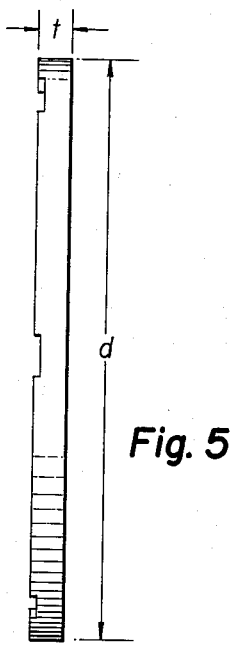
FIGURE 5 is a side elevational view, in the scale of FIGURE 1, of a thrust bearing showing the relationship of diameter to thickness.

In prior known construction, extreme accuracy of manufacture has been required. Perfect alignment of the two opposing surfaces and the relatively rotating parts has been necessary. It has further been discovered that the tolerances in this sort of construction may be materially reduced if the thrust bearing has certain inherent flexibility. It has been discovered that this tolerance may be so materially reduced that stamped, low cost thrust washer having stepped convergence construction may be employed. In FIGURE 5, the outside diameter of the washer is indicated as D and the thickness is indicated as T. Operable results may be obtained with respect to this flexibility characteristic if the ratio of $D/T$ is from 25 to 200, and optimum and preferred results are obtained if the ratio of D to T is 50 or more.

Figure 7:
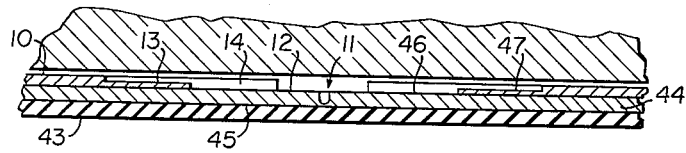
FIGURE 7 is a fragmentary sectional view, on an enlarged scale, of a bearing of the embodiment shown in FIGURE 1, showing a laminated bearing having a resilient back-up, a base, and a laminate of solid lubricant.

This ratio may be applied to any of the disclosures of this application to produce excellent results. It has further been discovered that a resilient laminate may be applied as a back-up to all of the constructions herein disclosed with the exception, of course, of the construction of FIGURE 6. In this case the resilient material may back-up the mating surface. In FIGURE 7 a laminating layer 43 is provided which is indicated as rubber. The material of the resilient laminate 43 may, of course, be any suitable resilient material.

In FIGURE 7 the employment of a laminate of solid lubricant is also disclosed. In that figure a base 44 which is preferably of steel or other suitable strong material is provided. The base is blanked into the desired finished configuration, which, for example, in the case of a thrust bearing, may be washer shaped. The resilient laminate 43 is fixed to the back face 45 of the base. Front or opposite face 46 of the base 44 is then masked to define the lower portion 12 of the relieved area. A laminate 47 of suitable solid lubricant is then applied to the unexposed areas of the face 46 by brushing, spraying, dipping or the like. Molybdenum disulfide is a suitable material which is a solid lubricant and which is well known as a material which can be applied in the form of a lubricant coating. The intermediate relieved portion 13 may then be masked off and a second coat of laminate may be applied if it is desired to produce a stepped convergence of one or more steps.

The foregoing order of steps is set out for illustrative purposes. It is, of course, within the scope of the invention to alter the order of the steps, as, for example, to apply the laminate before the washed is blanked out.

After the laminate 47 of the solid lubricant has been applied, the finished object may be placed in operation and run at slow break-in speeds. As long as relative movement is slow, a burnishing operation will be performed on the high spots of raised areas 10 and the compensators 14. Once the solid lubricant is worn down to an appropriate thickness, a fluid dynamic film will be produced and the burnishing action will cease.

Figure 8:
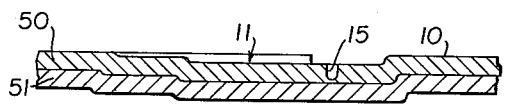
FIGURE 8 is a fragmentary sectional view on an enlarged scale showing a stamped stepped convergent bearing having a base and a laminate of fluid of solid lubricant.
Figure 9:
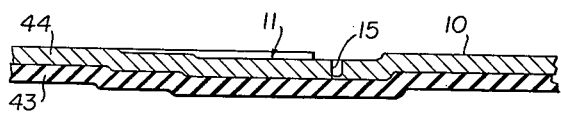
FIGURE 9 is a sectional view on an enlarged scale showing a stamped bearing having an integral resilient back-up.

In FIGURE 8, a laminate 50 of solid lubricant has been applied to a base 51. The material has then been inserted in an appropriate die and the finished thrust washer has been stamped. Thus, the entire bearing surface is a solid lubricant surface.

The methods disclosed with respect to FIGURES 7 and 8 provide extremely inexpensive methods of forming a stepped convergence surface, which is self-lubricating during starting and stopping. Thus, lubrication is provided by the solid lubricant until a fluid film is built up.

A further novel method of manufacturing stepped convergence surfaces by chemical milling has been devised. This method is particularly applicable to situations where relatively few surfaces of a given configuration are desired or where coining or stamping dies are not desired. In accordance with this method, a picture of the finished configuration of the device is first formed, and a photographic negative is made. A photographic image is then produced on a surface of the material in which the stepped convergence is to be formed. This image is produced with a film of substance resistant to etching solution. The exposed areas of the surface which are not protected by the substance are then etched by applying suitable etching solution such as acid. After sufficient material has been removed by the etching process, the solution resistant substance may be removed from the raised portions of the finished surface by a suitable solvent.

In an application where contact of the surfaces 58, 60 is desired upon starting and stopping of relative rotation, the spring 57 will be under compression. The spring 57, however, may be in tension to hold the surfaces 58, 50 out of contact until a fluid film is developed. If the spring 57 is under tension the surfaces 58, 60 will remain widely spaced until sufficient pressure exists in chamber 59 to cause pressure exerted on surface 63 to overcome the strength of the spring.

There has thus been described an improved device for producing a fluid dynamic film which is both yielding and reversible and wherein a plurality of stepped convergences, compensators for limitation of fluid escape, and immediate lubrication of the relatively moving parts have been provided.

Additionally, improved methods of applying a solid lubricant laminate to a fluid dynamic film producing device as well as a method of "chemical milling" a fluid dynamic film producing surface have been described.

Further, a device in the form of a sealed cartridge unit for ready insertion in a mechanism where it is to be employed has also been described.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A reversible fluid dynamic thrust bearing for movement relative to an opposed surface comprising, a circular body having a bearing surface, said surface having a plurality of spaced raised portions having flat and parallel bearing faces, at least one compensator extending along a path of relative movement in each of two opposite directions from each of said raised portions, and said surface also having a plurality of depressions, the extent of each of said depressions being defined by a pair of said raised portions and by said compensators, each of said depressions having a central and first and second intermediate base surfaces, the intermediate surfaces being circumferentially spaced and contiguous to the central surfaces, the central and base surfaces being disposed in radial planes, the intermediate surface planes being a common plane disposed between said central surface plane and the plane of said bearing faces, and said body having side walls joining the central surface and each intermediate surface to define a first step, and the body also having side walls joining each intermediate surface and the contiguous bearing face to define a second step.

2. A reversible thrust bearing cartridge unit, comprising, a housing having first and second relatively movable annular elements, said elements each having first and second radially disposed and spaced faces, the first element first face and the second element first face being complemental opposed surfaces for producing a fluid film therebetween upon relative rotation, said first faces each having a plurality of raised areas and a depression between each pair of raised areas, and each of said first faces also having at least one compensator extending circumferentially in each direction from each raised area along the path of intended relative rotation, said first element having a journal bearing section, said journal section being fixed to and extending laterally from said first element second face, said journal section having an inner fluid dynamic film producing surface, and a resilient laminate fixed to said second element second face.

3. A fluid dynamic thrust bearing comprising, an annular ring having a bearing face surface disposed in a radial plane, said bearing face surface having a plurality of recesses formed therein, each of said recesses having at least first and second parallel flat base surfaces disposed in radial planes, said first base surface being contiguous to a circumferential side wall of said recess; said first base surface, said circumferential wall and said bearing face surface together defining a first step; said second base surface being circumferentially spaced from said first step, said first and second base surfaces having a step side wall therebetween; said base surfaces and said step side wall together forming a second step; the plane of said first base surface being parallel to the plane of said bearing face surface and the plane of said second base surface and disposed therebetween, said ring having sufficient transverse rigidity to maintain said surfaces in such parallel planes when the device is in use, and said ring being transversely imperforate.

4. A fluid dynamic thrust bearing comprising, an annular ring having a bearing face surface disposed in a radial plane, said bearing face surface having a plurality of recesses formed therein, each of said recesses having at least first and second parallel flat base surfaces disposed in radial planes, said first base surface being contiguous to a circumferential side wall of said recess; said first base surface, said circumferential wall and said bearing surface together defining a first step; said second base surface being circumferentially spaced from said first step, said first and second base surfaces having a step side wall therebetween; said base surfaces and said step side wall together forming a second step; the plane of said first base surface being parallel to the plane of said bearing face surface and the plane of said second base surface and disposed substantially equal distances therefrom, said ring having sufficient transverse rigidity to maintain said surfaces in such parallel planes when the device is in use, and said ring being transversely imperforate.

5. A fluid dynamic thrust bearing comprising, an annular ring having a bearing face surface disposed in a radial plane, said bearing face surface having a plurality of recesses formed therein, each of said recesses having at least first and second parallel flat base surfaces disposed in radial planes, said first base surface being contiguous to a circumferential side wall of said recess; said first base surface, said circumferential side wall and said bearing face surface together defining a first step; said second base surface being circumferentially spaced from said first step, said first and second base surfaces having a step side wall therebetween; said base surfaces and said step side wall together forming a second step; the plane of said first base surface being parallel to the plane of said bearing face surface and the plane of said second base surface and disposed therebetween, said ring having sufficient transverse rigidity to maintain said surfaces in such parallel planes when the device is in use, and said ring having at least one compensator formed adjacent each such recess, said compensator defining one radial wall of said recess, said compensator having an outer surface disposed essentially in the plane of said bearing face surface.

6. In an article of manufacture having a shaft rotatable relative to a body the improvement which comprises, first and second complemental thrust surfaces formed on the shaft and body respectively, a reversible annular thrust bearing interposed therebetween, said thrust bearing having first and second spaced unidirectional bearing surfaces complemental to the first and second thrust surfaces, said first bearing surface having unidirectional means to generate a dynamic thrust load carrying film of fluid between the first surfaces on relative rotation of the shaft and body in one direction only, and said second bearing surface having unidirectional means to generate a dynamic thrust load carrying film of fluid between the second surfaces on relative rotation of the shaft and body in the other direction only.

7. In combination, a housing member having a bore therein, a shouldered shaft member projecting into the bore and journaled in the housing member, and a thrust bearing assembly surrounding the shaft member and carried by and interposed between the members, said assembly including first and second annular thrust washers having complemental fluid dynamic film forming thrust surfaces coactable with one another when the device is in use, one of said washers being operatively engageable with the shoulder of the shaft member, the other of the washers being operatively engageable with the housing member, and said assembly also including a washer retention housing having first and second flange means overlying the washers and a central section connected to each of the flange means and fixing the flange means in spaced relationship to retain the washers and maintain the assembly as a unit.

8. In combination, a housing member having a bore therein, a shouldered shaft member projecting into the bore and journaled in the housing member and a thrust bearing assembly surrounding the shaft member and interposed between the members, said assembly including first and second annular thrust washers having complemental fluid dynamic film forming thrust surfaces coactable with one another when the device is in use, one of said washers being operatively engageable with the shoulder of the shaft member, the other of the washers being operatively engageable with the housing member, and said assembly also including a washer retention housing having a central cylindrical section surrounding the washers and fixed to the housing member, said washer housing having end spaced inwardly directed end flanges fixed to the ends of the section, said flanges overlying the washers and retaining them in coactable relationship to maintain the assembly as a unit.

9. The device of claim 8 wherein the section is in said bore and press connected to the housing member.

10. The device of claim 6 wherein each of said unidirectional means comprises a plurality of recesses each having an end wall forming a convergent pressure increasing step.

11. The device of claim 6 wherein each such unidirectional means comprises first and second groups of recesses formed in the first and second bearing surfaces respectively, and wherein each of the recesses has first and second base surfaces with a connecting side wall therebetween, and wherein each recess of the first group has another side wall connecting the first base surface of such recess with the first bearing surface to define a second step and each recess of the second group has another side wall connecting the first base surface of such recess with the second bearing surface.

12. The device of claim 10 wherein each recess extends circumferentially from such step in the same circumferential direction as all other recesses.

References Cited in the file of this patent

UNITED STATES PATENTS

| | | |
|---|---|---|
| 25,921 | Stone | Oct. 25, 1859 |
| 1,289,048 | Kingsbury | Dec. 24, 1918 |
| 1,664,878 | Flintermann | Apr. 3, 1928 |
| 1,684,693 | Bohn | Sept. 18, 1928 |
| 1,786,565 | Freeman | Dec. 20, 1930 |
| 1,806,062 | Howarth | May 19, 1931 |
| 2,000,310 | White et al. | May 7, 1935 |
| 2,218,034 | Bartosch | Oct. 15, 1940 |
| 2,362,667 | Schmidt | Nov. 14, 1944 |
| 2,424,028 | Hoeberlein | July 15, 1947 |
| 2,498,485 | Clawson | Feb. 21, 1950 |
| 2,577,798 | Neubauer | Dec. 11, 1951 |
| 2,653,062 | Sperisen | Sept. 22, 1953 |
| 2,731,308 | Wilcock | Jan. 17, 1956 |

FOREIGN PATENTS

| | | |
|---|---|---|
| 868,087 | Germany | Feb. 23, 1953 |
| 181,468 | Austria | Mar. 25, 1955 |